April 5, 1938.  R. G. ROSS  2,113,468
WARDROBE FOR SCHOOLHOUSES
Filed Dec. 23, 1936   6 Sheets-Sheet 1
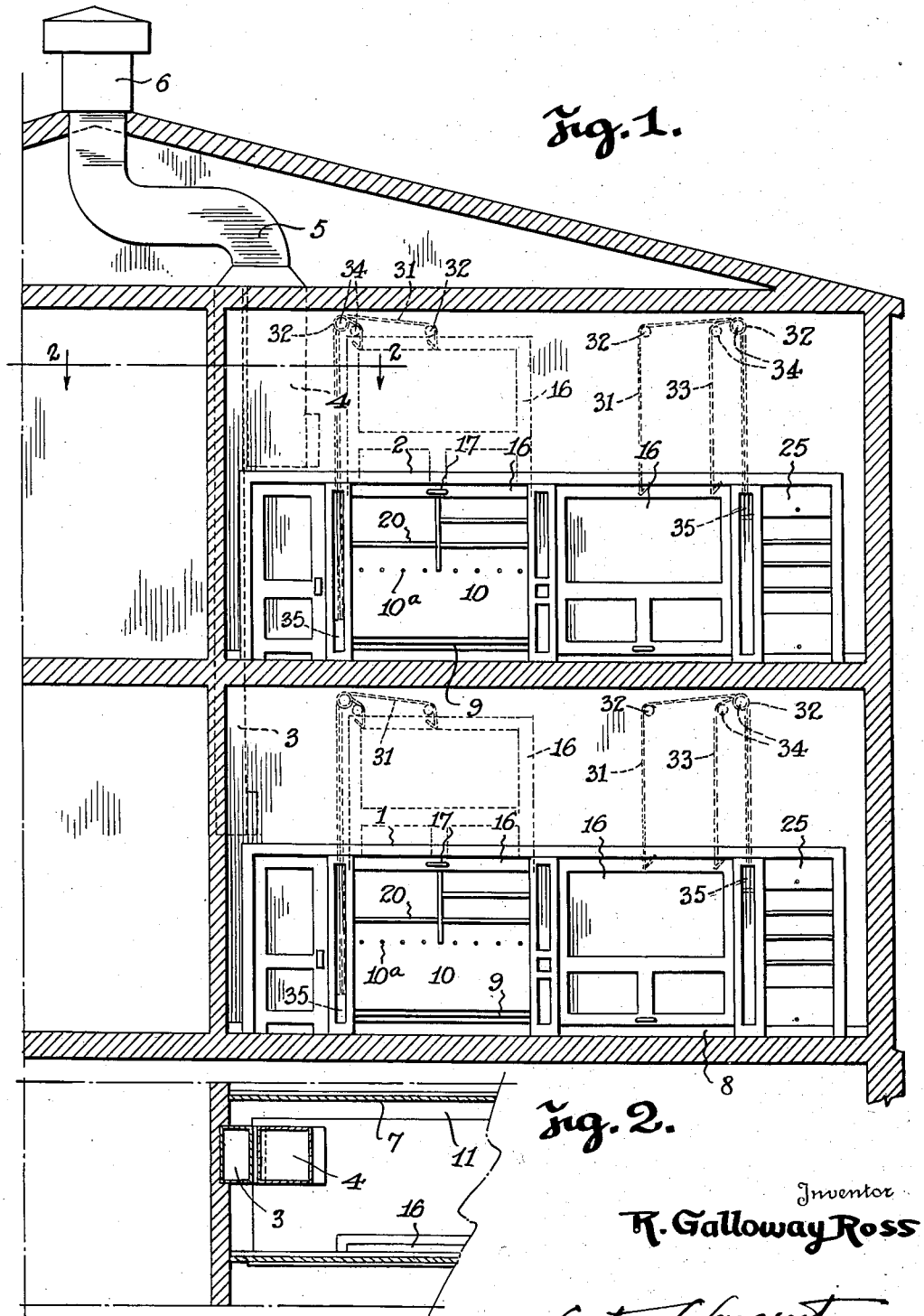
Inventor
R. Galloway Ross
By Lester L. Sargent
Attorney April 5, 1938.   R. G. ROSS   2,113,468
WARDROBE FOR SCHOOLHOUSES
Filed Dec. 23, 1936   6 Sheets-Sheet 2
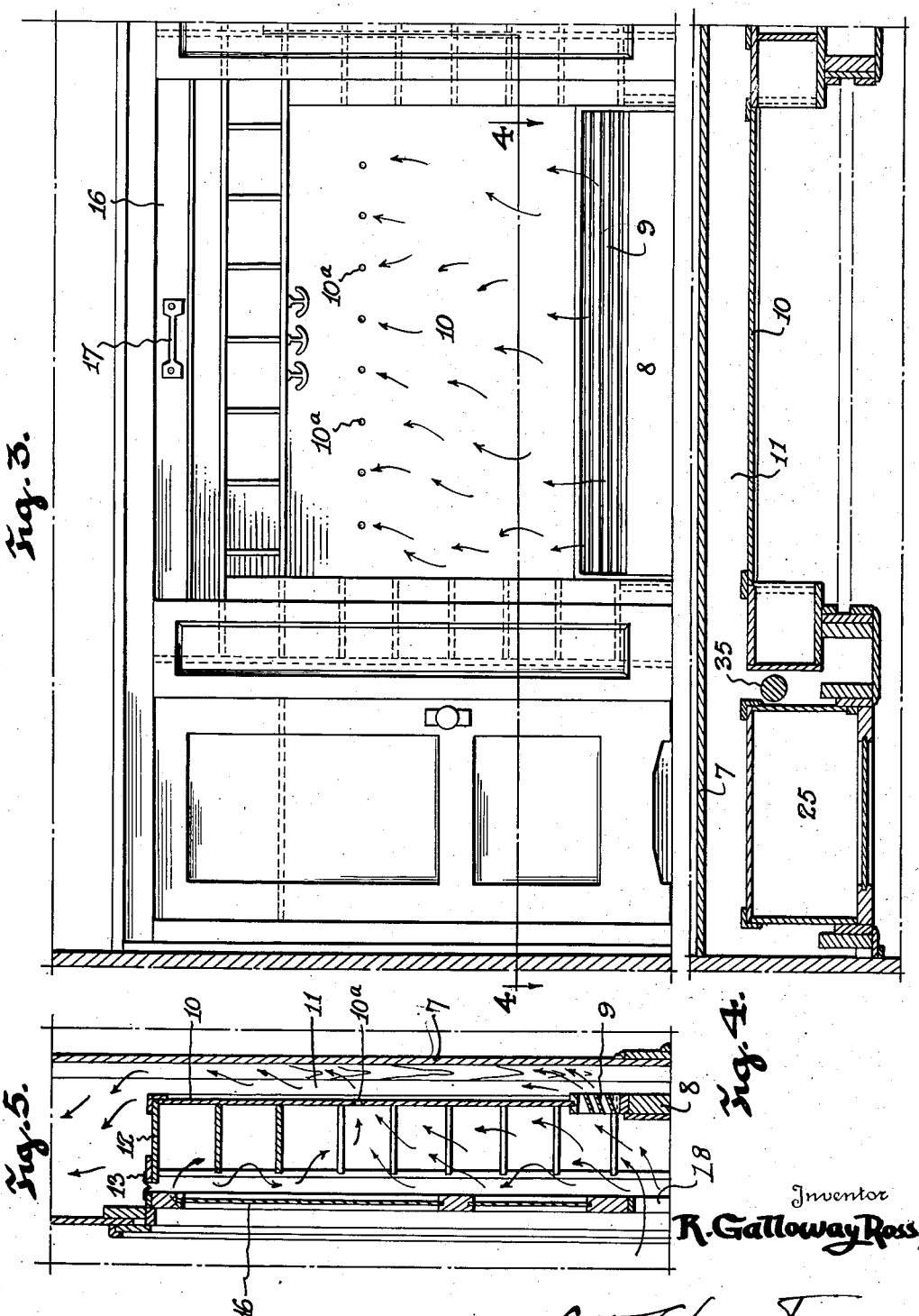
Inventor
R. Galloway Ross
By Lester L. Sargent
Attorney April 5, 1938.  R. G. ROSS  2,113,468
WARDROBE FOR SCHOOLHOUSES
Filed Dec. 23, 1936  6 Sheets-Sheet 3
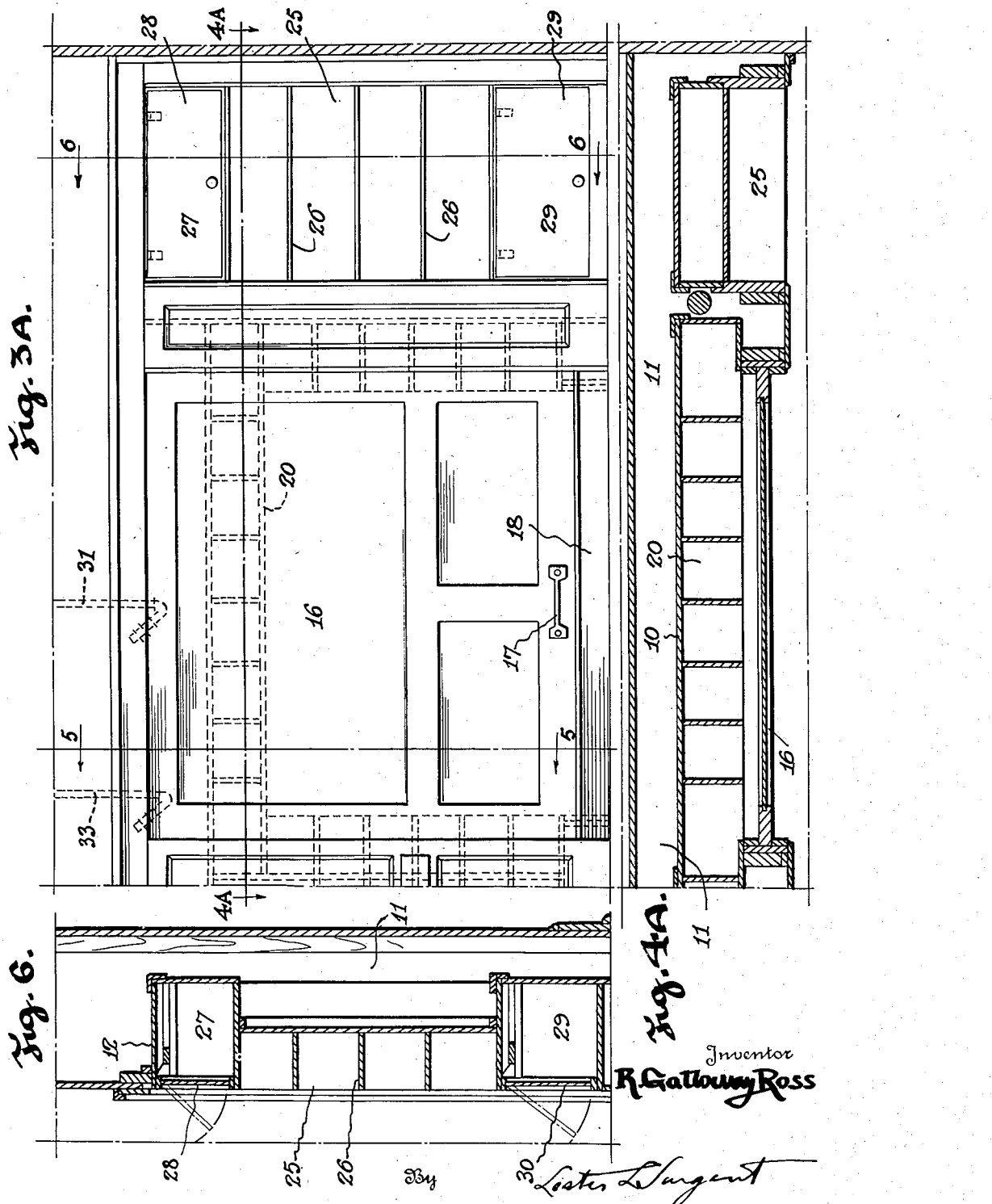

April 5, 1938.   R. G. ROSS   2,113,468
WARDROBE FOR SCHOOLHOUSES
Filed Dec. 23, 1936   6 Sheets-Sheet 4
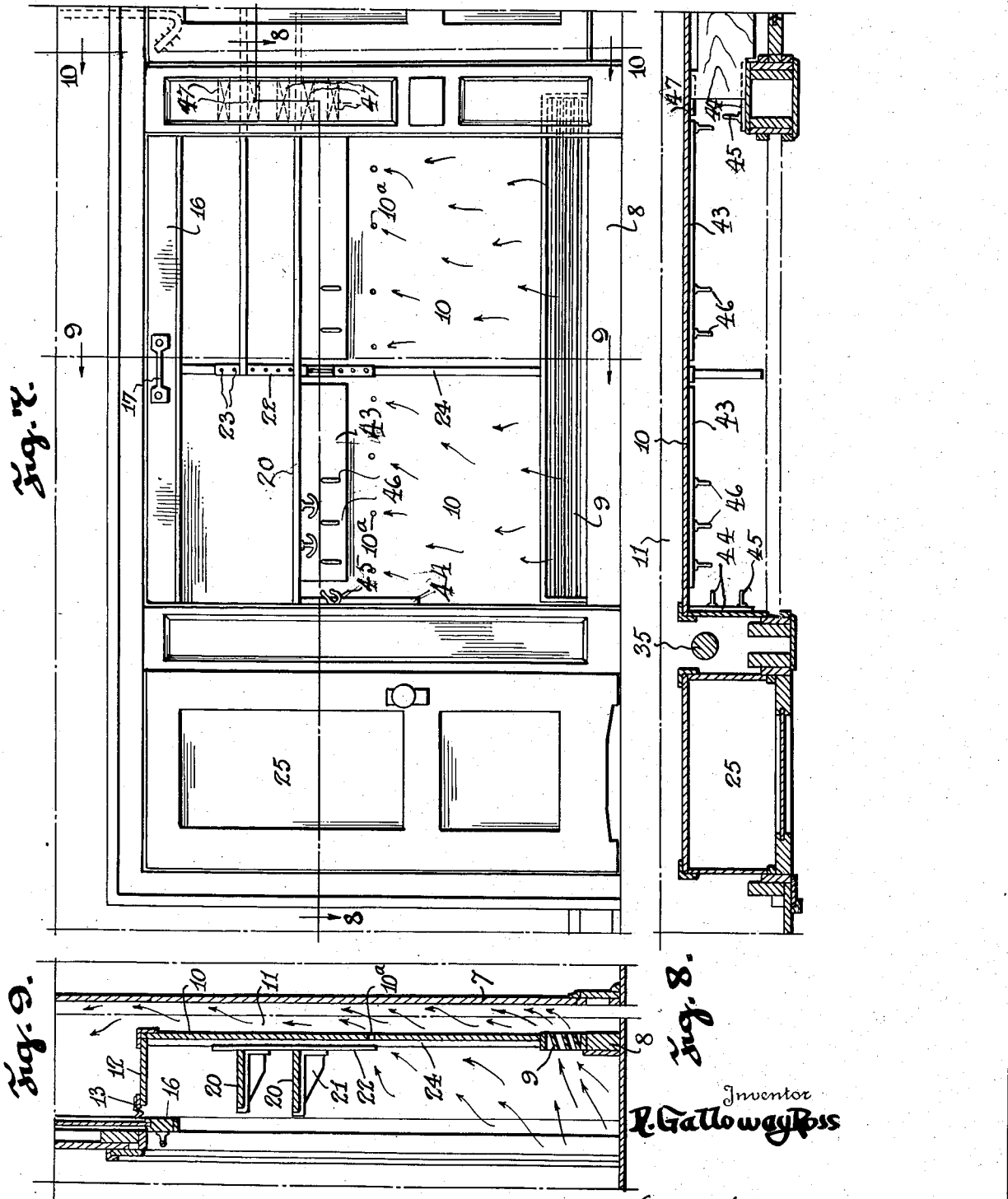
Inventor
R. Galloway Ross
By Lester L. Sargent
Attorney April 5, 1938.  R. G. ROSS  2,113,468
WARDROBE FOR SCHOOLHOUSES
Filed Dec. 23, 1936  6 Sheets-Sheet 5
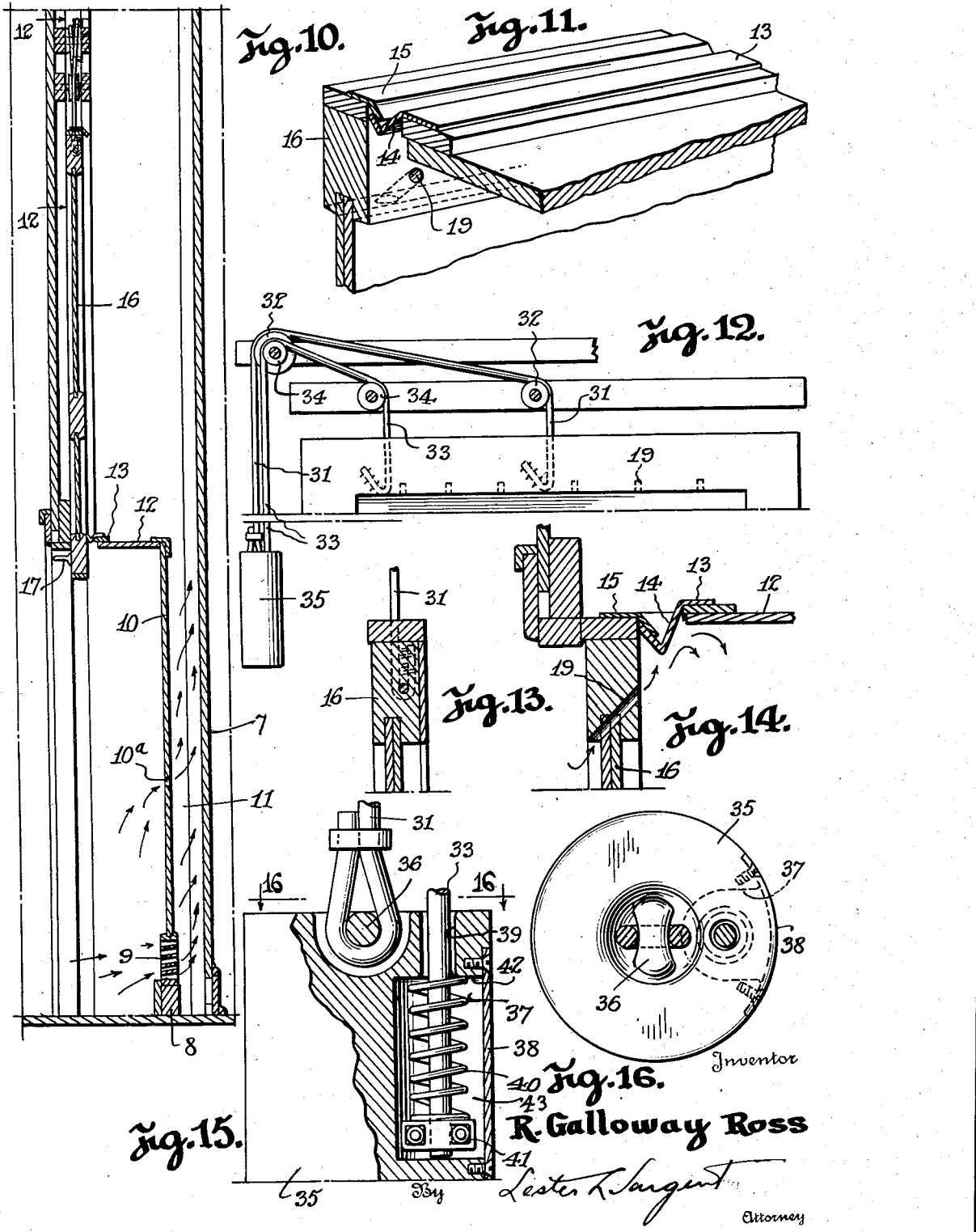
Inventor
R. Galloway Ross
By Lester L. Sargent
Attorney

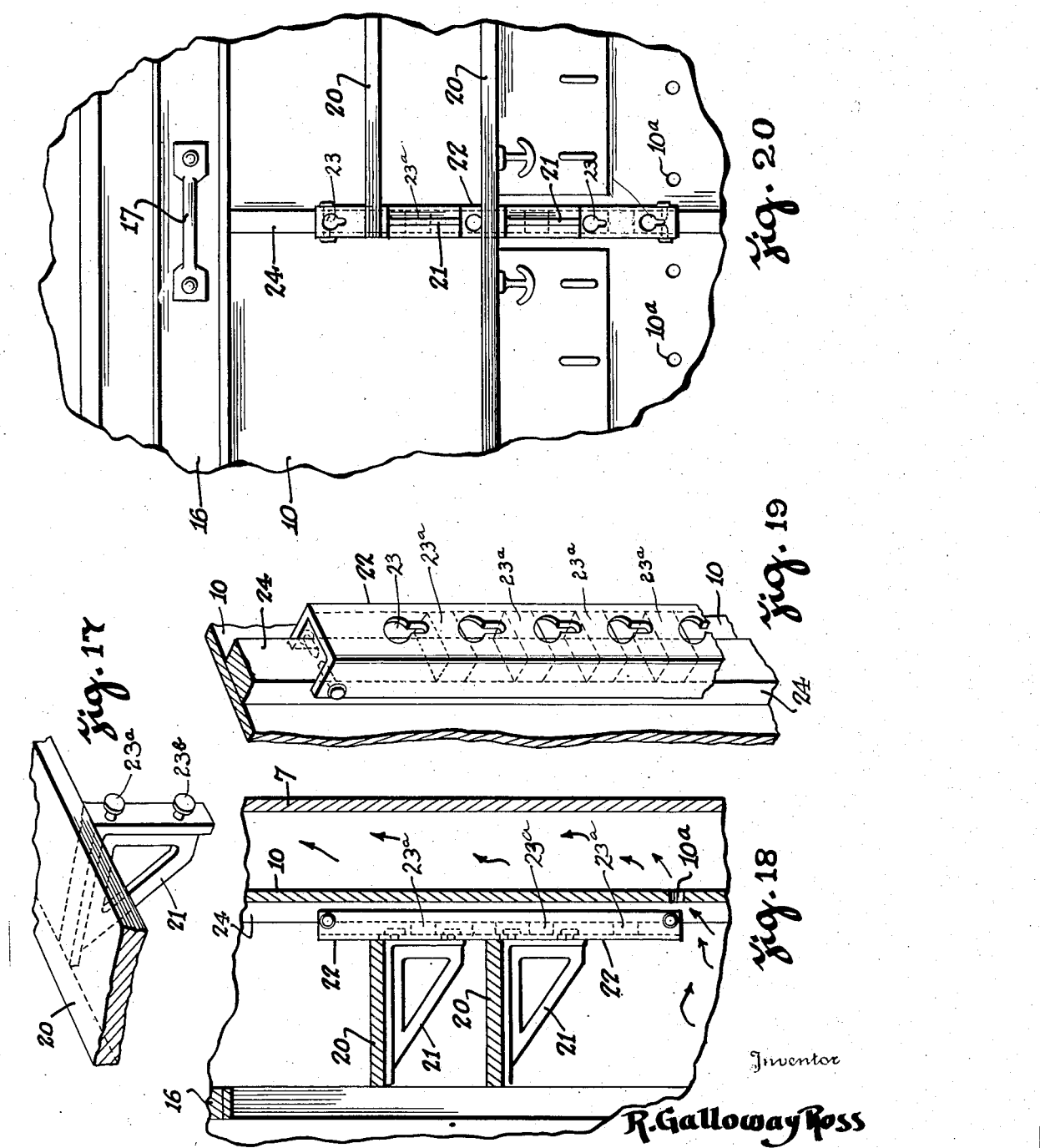

Patented Apr. 5, 1938

2,113,468

UNITED STATES PATENT OFFICE 2,113,468

WARDROBE FOR SCHOOLHOUSES

Robert Galloway Ross, Charlotte, N. C.

Application December 23, 1936, Serial No. 117,405

5 Claims. (Cl. 312—189)

This application is a continuation in part of and an improvement on my application, Serial No. 39,468, filed September 6, 1935.

The object of my invention is to provide a safer mechanism for operating the doors to a position where they will be out of the way when open, to provide improved means for ventilation of the wardrobe, and to provide means for permitting of adjustment of shelves and compartments to the proper height for children of different sizes in different grades; and to provide means for keeping the compartments in which lunches are placed free from air heavily ladened with dust.

It is also an object of my invention to provide a wardrobe especially adapted for use in schoolhouses and having an arrangement of compartments which will be most useful for such use.

I attain these and other objects of my invention by the mechanism illustrated in the accompanying drawings, in which—

Figure 1 is a vertical section through a schoolhouse showing my wardrobe for two different floors in front elevation with two of the doors of the wardrobe in closed and two in open position;

Fig. 2 is a horizontal section on line 2—2 of Fig. 1 showing the relative size of the ventilation flues;

Fig. 3 is a front elevation of the left half or section of the wardrobe with the portion in open position;

Fig. 3A is a view of the right section or half of the wardrobe with the door of that section shown in closed position;

Fig. 4 is a horizontal section on line 4—4 of Fig. 3;

Fig. 4A is a horizontal section on line 4A—4A of Fig. 3A;

Fig. 5 is a vertical section on line 5—5 of Fig. 3A;

Fig. 6 is a vertical section on line 6—6 of Fig. 3A;

Fig. 7 is a front elevation of a section of the wardrobe with the door in open position and illustrating a means for adjusting the position of the shelves;

Fig. 8 is a horizontal section on line 8—8 of Fig. 7;

Fig. 9 is a vertical section on line 9—9 of Fig. 7;

Fig. 10 is a vertical section on line 10—10 of Fig. 7;

Fig. 11 is a perspective view, partly in vertical section, of the top of the wardrobe showing the means for keeping out dust from the upper or food compartment of the wardrobe;

Fig. 12 is a detailed front elevational view of the counter-weight mechanism and cables for raising and lowering the door or preventing its falling in case the main cable breaks;

Fig. 13 is a vertical section through the upper frame member of the door, illustrating the means for fastening the cable 31 to the door;

Fig. 14 is a vertical section through the upper frame member of the door and adjacent mechanism on a vertical plane passing through the center of the ventilation channel 19;

Fig. 15 is a view partly in section and partly in elevation of the counter-weight and the means for attaching the cables 31 and 33 to the counter-weight;

Fig. 16 is a horizontal section on line 16—16 of Fig. 15;

Fig. 17 is a detail perspective view of a portion of one of the shelves 20 and the supporting means;

Fig. 18 is a section similar to Fig. 9 but considerably enlarged;

Fig. 19 is a perspective view of member 22 showing how it is mounted on member 24; and Fig. 20 is a plan view of a portion of the cabinet similar to a portion of the view shown in Fig. 7 but considerably enlarged.

Like numerals designate like parts in each of the several views.

Referring first to Fig. 1 of the drawings, there is illustrated a two-story schoolhouse having one of my cabinets on the first floor and a similar cabinet 2 on the second floor. A flue 3 extends to a plane just above the top of the cabinet on the first floor and a flue 4 of double the cross-sectional area of the flue 3 extends to a plane just above the cabinet on the second floor. These flues merge in a common flue 5 which extends to the ventilator 6 on the top of the building.

Referring to Figs. 2 to 5 inclusive, the numeral 7 designates either a building wall, if the cabinet is set in that recess in the building, or a partition wall if the partition has been built. The rear wall of the cabinet consists of the base strip 8, the louvers 9 mounted directly over the base strip 8 and the rear cabinet wall 10 which a little over half-way up is provided with openings 10A to facilitate ventilation of the cabinet. The cabinet is spaced from the building or partition wall 7, leaving a ventilation space 11 as illustrated in Figs. 5, 9 and 15.

Attached to the top 12 of the cabinet is a metal strip 13 which has a V-shaped trough 14 projecting beyond the top of the cabinet to the edge of the top of the vertically slideable door 16. Affixed to the top of the vertically slideable door 16 is a strip 15 having a downwardly-slanting overhanging portion which seats in the trough 14 as shown in Figs. 11 and 14.

Referring to Figs. 3 and 3A, the cabinet door 16 has a conventional handle 17 fastened to its bottom frame member. The cabinet door does not reach the floor when in closed position but a space 18 is left between the bottom of the cabinet door and floor when the door is closed, as shown in Figs. 5 and 3A.

As shown in Figs. 11 and 14, I provide one or more channels 19 through the upper frame member of the door 16 to permit a slight amount of circulation of air therethrough.

Channels 19 may, however, be reduced if it is desired to more tightly inclose the upper compartments. I have found, however, that best results are obtained by dividing and arranging the channels 19 in the manner shown, and as thus disposed they are not visible from the front of the cabinet as the exterior opening is in a plane with the bottom of the upper frame member of the cabinet door.

As many shelves 20 as desired may be provided for the cabinet and my preferred means of mounting these shelves is to provide shelf brackets 21 mounted on vertical supports 22 which are provided with apertures 23 or equivalent means for engaging suitable studs 23b such as screws or nails, the heads of which are insertable in the apertures 23 of supports 22 whereby to hold the shelf brackets or shelves 20 in an adjustable relation to the vertical supports 22, as shown in Figs. 18 and 20. Plugs or blocks 23a, as shown in Fig. 17, are placed between the apertures 23 to prevent air circulating around the shelves 20. The vertical supports 22 are in turn affixed to a vertical strip 24 affixed to the rear wall of the cabinet, as illustrated in Figs. 7, 8, 9 and 19. By providing adjustable shelves the cabinet may be adjusted to the proper height for children of different sizes in different grades, so that each group or grade may have their cabinet adjusted to suit their height, or if the grade in a particular room is changed to a different grade, the shelves in the cabinets may be adjusted to suit the height of children of a different age and grade.

Referring to Figs. 3A and 6, the side cabinet 25 has a plurality of shelves 26, as shown, and an upper compartment 27 which has a hinged door 28. This side cabinet also has a lower compartment 29 with a similar hinged door 30.

Referring to Fig. 1 and Figs. 12-16, each cabinet door is operated by a main cable 31 fastened preferably to the central portion of its upper frame member and passing upward and over a plurality of rollers or pulleys 32 mounted on suitable stationary elements as shown in Fig. 12, such stationary elements being either an integral part of the cabinet, or if desired, a part of the frame work of the building above the cabinet, and being attached at the other end to the link or metal member 36 of a counterweight 35. I also provide a novel safety cable 33 fastened to the upper frame member of the cabinet door in a position offset from center. This cable 33 passes over the rollers 34 to the counterweight. It is inserted through a channel 39 of slightly greater diameter than the diameter of the cable 33 into a recess or chamber 43 in the counterweight, where it is secured to the bolt plate or washer 41. A spring 37 is interposed between the bolt plate 41 and the top 42 of the chamber 43 to permit of a degree of flexible movement of the cable 33 under tension. The recess 43 is normally sealed by the removable plate 38, as shown in Fig. 15.

In operation, the cabinet door is raised by grasping the handle 17 and sliding the door vertically upward to an open position, as shown in Figs. 3, 7 and 10, or brought to a lowered position as shown in Figs. 5 and 3A. The weight of the door is counter-balanced by the counterweight 35. In the event, however, of the breakage of the main cable 31, the safety cable by reason of its attachment to the top of the frame in an offset position, would cause the door to tilt and wedge and prevent it from falling and injuring the person operating it. It would also thus call attention to the fact that the main cable had broken and would make it necessary to repair the main cable before continuing use of the cabinet. Safety cable 33 having no weight on same except the pull of spring 37, which is just sufficient to take up slack, is sure to be in good condition when main cable 31 fails.

One of the principal objects of my invention is to provide proper ventilation of the cabinets and of the school room in connection with the cabinets, and it will be noted that when the cabinet door is in closed position, as illustrated in Fig. 3A, there is a space 18 left between the bottom of the door and the floor, and through this space air will circulate and pass through the louvers 9 and the openings 10A in the rear wall of the cabinet into the space 11 between the rear wall of the cabinet and the partition or wall 7 of the building, as shown in Figs. 5, 9 and 10.

The upper compartment of the cabinet is intended as a compartment for the lunches of the children and this compartment is kept dust-proof or substantially dust-proof by means of the V-shaped projecting strip 14 affixed to the top of the cabinet and the overhanging strip 15 which is adapted to seat in the V-shaped trough 14 when the door is in its lowered position, thus preventing any seepage of dust from above the cabinet into its upper food compartment. Members 14 and 15 also prevent suction from bringing dust-ladened air passing under door through opening 18 into upper or shelf section.

I have found it desirable to have a slight ventilation in this upper compartment and for that purpose I provide a small upwardly-slanting small air channel 19 in the upper frame member of the cabinet door 16, as shown in Fig. 14. The disposition of this channel, however, which opens on the underside of the upper door frame member, is such as to minimize dust entering the upper compartment. Channels 19 are very small and just sufficient to give a trace of air above breathing level through the food compartment, the air by reason of having no other outlet must go downward. Air at breathing level is not dust-ladened as is the air near the floor.

By the construction illustrated, ventilation is definitely confined to the floor, increasing efficiency in ventilating the class room and also saving heat. The movement of air on the floor also will dry drippings from clothing during rainy seasons. Air entering the lower portion of the cabinet will pass through the louvers 9 and the higher openings 10A and is shut off from the upper compartment by the width of the shelves which extend to the cabinet door or substantially to the cabinet door. Also the force of circulation of air itself will cause any dust to pass through the louvers and into the space 11 in back of the cabinet and on up the flues 3 and 4 which are provided for ventilation.

As the doors are vertically slideable, when opened they are entirely out of the way, giving full visibility of children and contents and eliminating confusion and error, and also preventing damage to the doors and also facilitating the cleaning of closets. Also no class room space is required for doors as would be necessary if swinging doors were used. The doors are exactly counterweighted, and ball-bearing, roller-bearing or other suitable pulleys insure easy operation of the doors. Also the arrangement of cabinets and shelves as illustrated in Figs. 3 and 3A of the drawings is advantageous for school purposes as the cabinets provide space for clothing and lunches and the shelves in the side compartments provide space for books and other articles.

As shown in Figs. 7 and 8, I provide a wall strip 43 affixed to shelf 20 and movable with it. This wall strip carries hooks 46 and the wall strip and shelf 20 are adjusted simultaneously.

As shown in Figs. 7 and 8 I provide adjusting boards 44 which are held in place by three screws inserted in the center of the boards so that the boards may be moved up or down. The boards are of sufficient length to cover all of the screw holes when the member 44 is adjusted to either an upper or lower position. These adjusting boards 44 carry hooks 45 for hanging clothes. Members 47 are spaced blocks affixed to the upper wall of the cabinet to support the shelves in various adjusted positions and cooperate with the adjusting boards 44 which adjustably support the ends of the shelves. By tilting the forward edge of the shelf upward it may be moved upwardly or downwardly from one of the spaced blocks 47 to another when adjustment of the shelf is desired.

What I claim is:

1. In a wardrobe for schools having a vertically slideable door, a main cable affixed to approximately the central portion of the upper frame member of the door, stationary elements, pulleys mounted on said stationary elements over which said cable travels, a counterweight to which said cable is affixed, a secondary safety cable affixed to the upper frame member of the door in a plane offset from center, pulleys mounted on the aforesaid stationary elements over which said safety cable travels, and a resilient attachment of said safety cable to the counterweight whereby the counterweight is resiliently connected to the door by the safety cable, and is adapted to cause the door to tilt and wedge in the frame and to prevent its falling in event of breakage of the main cable.

2. In a wardrobe of the type described, the combination of a cabinet, shelves mounted in the cabinet, apertured bars affixed to the rear walls of the cabinet for adjustably supporting the shelves in any of a plurality of vertically adjusted positions and plugs placed between the apertures to prevent air circulating through the bars and around the shelves, substantially as described.

3. In a wardrobe of the type described, the combination with a cabinet of a vertical slideable door, a pair of cables attached to the door at spaced positions, a main cable being centrally located and an auxiliary cable being offset therefrom, rollers over which said cables travel, means supporting said rollers, a counterweight to which both cables are affixed, whereby if one of the cables breaks, the other will hold the door against falling, one of the cables having a resilient attachment to the counterweight to take up slack, said cable bearing the weight of the door only in case the main cable should fail to function, the cable having an offset connection to the door to cause the door to wedge in place in the event the main cable breaks.

4. In a wardrobe of the type described, the combination in a cabinet, of a door, a shelf positioned in upper portion of same and extending substantially to the plane of the door, a counterweight for said door, a pair of cables attached to the counter-weight and to the upper frame member of the door at the center and at a point offset from center, respectively, pulleys, means for supporting said pulleys above the wardrobe, the wardrobe having a ventilation opening below the bottom edge of the door when the door is in its lowermost position, and having one or more ventilation openings in the rear wall near the middle portion thereof and in a plane substantially above the plane of the ventilation opening below the bottom of the door, and also having ventilation openings slightly above the ventilation opening below the bottom of the door to divert currents of air to a space back of the rear wall of the cabinet, and flues with which said space back of the rear wall of the cabinet is in communication substantially as described.

5. In combination with the wardrobe described in claim 2, wall strips carrying hooks and attached to the aforesaid shelves and movable therewith.

ROBERT GALLOWAY ROSS.